United States Patent [19]

Quesenberry

[11] Patent Number: 5,646,913
[45] Date of Patent: Jul. 8, 1997

[54] TEACHING CLOCK WITH REMOVABLE REPOSITIONABLE PIECES FOR REPRESENTING DIFFERENT PERIODS OF TIME

[76] Inventor: Lyndale W. Quesenberry, 260 Spaulding Dr., Apt. 103, Kent, Ohio 44240

[21] Appl. No.: 443,593

[22] Filed: Nov. 24, 1995

[51] Int. Cl.$^6$ .............................. G09B 19/12; G04B 19/06
[52] U.S. Cl. .............................. 368/223; 368/228; 368/89
[58] Field of Search .................................... 368/223–228, 368/229–237, 89; 434/304, 196

[56] References Cited

U.S. PATENT DOCUMENTS

| | | | |
|---|---|---|---|
| 2,647,330 | 8/1953 | Ford | 434/304 |
| 2,853,804 | 9/1958 | Bengeyfield | 434/304 |
| 3,608,214 | 9/1971 | Rancati | 434/304 |
| 4,124,945 | 11/1978 | Totten | 35/39 |
| 4,368,045 | 1/1983 | Kuh | 434/304 |

Primary Examiner—Bernard Roskoski

[57] ABSTRACT

A teaching clock with removable repositionable pieces for representing different periods of time including a housing having an interior and an opening for allowing access to the interior; a timing mechanism disposed within the interior of the housing for keeping track of a current hour of a day; a dial face plate extended over the timing mechanism of the housing; an hour hand coupled to the timing mechanism, disposed over the dial face plate, and rotatable relative to the dial face plate for indicating the current hour; a plurality of different-sized and generally pie-shaped pieces positionable upon the dial face plate and below the hour hand, each piece subtending a sectoral region on the dial face plate in relation to the hour hand for representing a period of time when a certain activity is to be performed; and a first coupling mechanism for removably coupling the pieces to the dial face plate.

1 Claim, 4 Drawing Sheets

TEACHING CLOCK WITH REMOVABLE REPOSITIONABLE PIECES FOR REPRESENTING DIFFERENT PERIODS OF TIME

BACKGROUND OF THE INVENTION

1. Field of the Invention

The present invention relates to a teaching clock with removable repositionable pieces for representing different periods of time and more particularly pertains to providing an indication to a child when a particular activity is to be performed with a teaching clock with removable repositionable pieces for representing different periods of time.

2. Description of the Prior Art

The use of timer mechanisms is known in the prior art. More specifically, timer mechanisms heretofore devised and utilized for the purpose of providing an indication of time are known to consist basically of familiar, expected and obvious structural configurations, notwithstanding the myriad of designs encompassed by the crowded prior art which have been developed for the fulfillment of countless objectives and requirements.

By way of example, U.S. Pat. No. Des. 268,686 to Wolf discloses a children's clock. U.S. Pat. No. Des. 269,977 to Gopfert discloses a children's educational clock. U.S. Pat. No. Des. 281,334 to Adams discloses a child's clock figure toy. U.S. Pat. No. 4,725,061 to Gross discloses a children's clock. U.S. Pat. No. 5,167,507 to Cobb et al. discloses a teaching clock having indicia carrier allowing curvilinear translation of indicia. U.S. Pat. No. 5,283,769 to Renton discloses a clock.

While these devices fulfill their respective, particular objective and requirements, the aforementioned patents do not describe a teaching clock with removable repositionable pieces that allows different periods of time during a day to be represented with a plurality of pieces and with the pieces in association with a hand of the clock indicating to a child when a particular activity is to be performed.

In this respect, the teaching clock with removable repositionable pieces for representing different periods of time according to the present invention substantially departs from the conventional concepts and designs of the prior art, and in doing so provides an apparatus primarily developed for the purpose of providing an indication to a child when a particular activity is to be performed.

Therefore, it can be appreciated that there exists a continuing need for new and improved teaching clock with removable repositionable pieces for representing different periods of time which can be used for providing an indication to a child when a particular activity is to be performed. In this regard, the present invention substantially fulfills this need.

SUMMARY OF THE INVENTION

In the view of the foregoing disadvantages inherent in the known types of timer mechanisms now present in the prior art, the present invention provides an improved teaching clock with removable repositionable pieces for representing different periods of time. As such, the general purpose of the present invention, which will be described subsequently in greater detail, is to provide a new and improved teaching clock with removable repositionable pieces for representing different periods of time and method which has all the advantages of the prior art and none of the disadvantages.

To attain this, the present invention essentially comprises, in combination, a rigid housing having a circular planar base plate with a rim extended peripherally upwards therefrom to define a hollow interior and a central circular opening for allowing access to the interior. The wall of the housing further includes a pair of diametrically positioned clasps coupled thereto and extended outwards therefrom and a groove formed thereon at a location between the clasps. A timing means is provided and disposed within the interior of the housing for keeping track of a current hour of a day. A dial face plate is included and extended over the timing means and across the opening of the housing and with the dial face plate having a recessed area with a circumferential border positioned in axial alignment with the housing. An hour hand is included and coupled to the timing means and disposed over the dial face plate and with the hour hand rotatable about a centrally disposed axis relative to the dial face plate for indicating the current hour. A plurality of different-sized and generally pie-shaped pieces is included and attachably fastened within the recessed area of the dial plate below the hour hand. Each piece subtends a sectoral region on the dial face plate in relation to the hour hand for representing a period of time when a certain activity is to be performed. Each piece bears different pictorial designs or motifs or colors representing the activity to be performed when the hour hand is positioned over the piece. A generally circular face plate cover is included and hingably coupled to the housing. The face plate cover has a generally transparent circular viewing port, an annular border secured about the viewing port, and a latch extended outwards from the border. The latch of the face plat cover is removably positioned within the groove of the housing for securing the face plate cover over the opening of the housing and thereby precluding access to the pieces. Lastly, a wrist band is provided. The wrist band is formed of a first strap coupled to one of the clasps and a second strap coupled to the other clasp. The first strap has a strip of pile-type fastener coupled thereto and the second strap has a complimentary strip of pile-type fastener coupled thereto. The pile-type fasteners are securable in a closed loop configuration about a wrist of a wearer.

There has thus been outlined, rather broadly, the more important features of the invention in order that the detailed description thereof that follows may be better understood, and in order that the present contribution to the art may be better appreciated. There are, of course, additional features of the invention that will be described hereinafter and which will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of description and should not be regarded as limiting.

As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

Further, the purpose of the foregoing abstract is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The abstract is neither intended to define the invention of the application, which is measured by the claims, nor is it intended to be limiting as to the scope of the invention in any way.

It is therefore an object of the present invention to provide a new and improved teaching clock with removable repositionable pieces for representing different periods of time which has all the advantages of the prior art timer mechanisms and none of the disadvantages.

It is another object of the present invention to provide a new and improved teaching clock with removable repositionable pieces for representing different periods of time which may be easily and efficiently manufactured and marketed.

It is a further object of the present invention to provide a new and improved teaching clock with removable repositionable pieces for representing different periods of time which is of durable and reliable construction.

An even further object of the present invention is to provide a new and improved teaching clock with removable repositionable pieces for representing different periods of time which is susceptible of a low cost of manufacture with regard to both materials and labor, and which accordingly is then susceptible of low prices of sale to the consuming public, thereby making such a teaching clock with removable repositionable pieces for representing different periods of time economically available to the buying public.

Still yet another object of the present invention is to provide a new and improved teaching clock with removable repositionable pieces for representing different periods of time which provides in the apparatuses and methods of the prior art some of the advantages thereof, while simultaneously overcoming some of the disadvantages normally associated therewith.

Even still another object of the present invention is to provide a new and improved teaching clock with removable repositionable pieces for representing different periods of time for providing an indication to a child when a particular activity is to be performed.

Lastly, it is an object of the present invention to provide a new and improved teaching clock with removable repositionable pieces for representing different periods of time comprising a housing having an interior and an opening for allowing access to the interior; timing means disposed within the interior of the housing for keeping track of a current hour of a day; a dial face plate extended over the timing means and across the opening of the housing; an hour hand coupled to the timing means, disposed over the dial face plate, and rotatable relative to the dial face plate for indicating the current hour; a plurality of different-sized and generally pie-shaped pieces positionable upon the dial face plate and below the hour hand, each piece subtending a sectoral region on the dial face plate in relation to the hour hand for representing a period of time when a certain activity is to be performed; and a first coupling means for removably coupling the pieces to the dial face plate.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be had to the accompanying drawings and descriptive matter in which there is illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein.

The same reference numerals refer to the same parts through the various Figures.

DESCRIPTION OF THE PREFERRED EMBODIMENT

With reference now to the drawings, the preferred embodiment of the new and improved teaching clock with removable repositionable pieces for representing different periods of time embodying the principles and concepts of the present invention and generally designated by the reference number 10 will be described.

The preferred embodiment of the present invention comprises a plurality of components. In their broadest context, such components include a housing, timer mechanism, dial face plate, hour hand, pie-shaped pieces, face plate cover, coupling means, and optional supporting means. Such components are individually configured and correlated with respect to each other for providing an indication to a child when a particular activity is to be performed.

Figure 5:
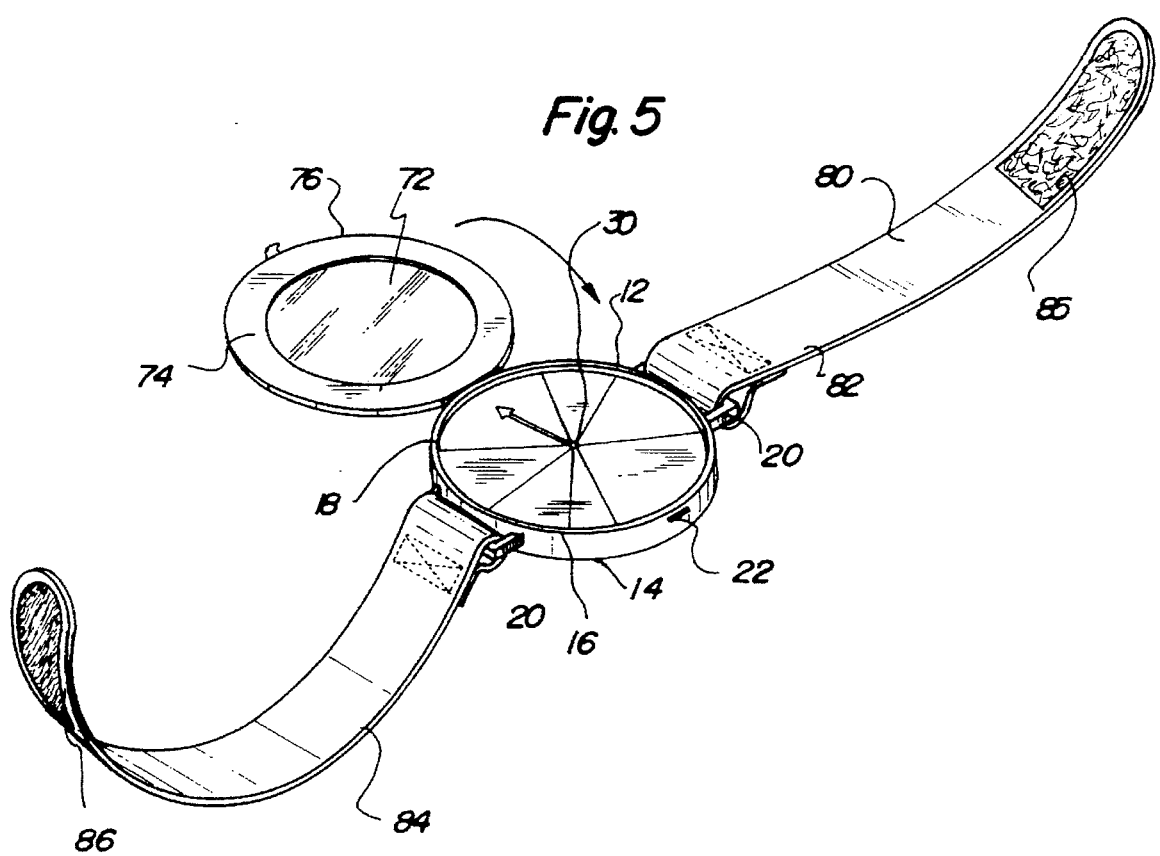
FIG. 5 is a perspective view of the preferred embodiment constructed in accordance with the principles of the present invention.

Specifically, with reference to FIG. 5, the present invention includes a housing 12. The housing is rigid in structure and formed of metal or plastic. The housing has a circular planar base plate 14 with a rim 16 extended peripherally upwards therefrom to define a hollow interior and a central circular opening 18 for allowing access to the interior. The wall of the housing has a circular horizontal cross section and further includes a pair of diametrically opposed clasps 20. The clasps are coupled to the wall and extended outwards therefrom. Each clasp is rigid in structure and has a general u-shape. Furthermore, the wall of the housing includes an elongated groove 22 formed thereon at a midpoint location between the clasps.

A timing mechanism 30 is also included. The timing mechanism is disposed within the interior of the housing. The timing mechanism is formed of a conventional mechanical clockwork for keeping track of a current hour of a day. The clock can be wound and set using a knob extended from the wall of the housing as is conventional. Other conventional timing mechanisms employing electro-mechanical components may also be utilized.

Figure 6:
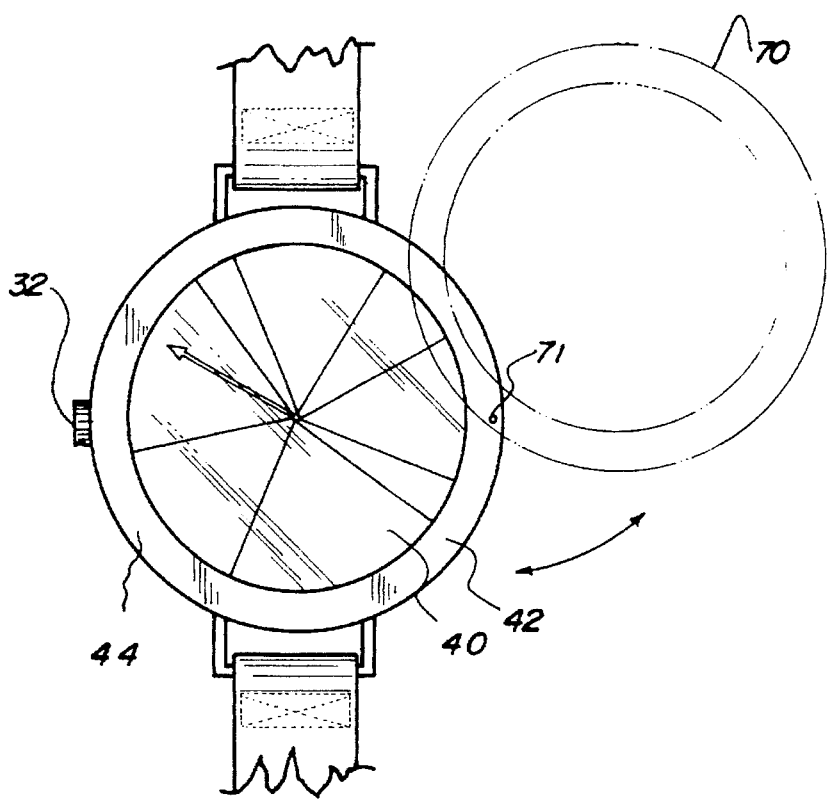
FIG. 6 is a fragmentary plan view of the present invention shown in FIG. 5.

Extended over the timing mechanism 30 and across the opening 18 of the housing is a dial face plate 40. The dial face plate is circular and generally flat in structure. The dial face plate has a recessed area 42 formed centrally thereon that defines a circumferential border 44. The border is positioned in axial alignment with the housing as shown in FIG. 6.

Coupled to the timing mechanism 30 and disposed over the dial face plate 40 is an elongated hour hand 50. The hour hand is operatively coupled to the timer mechanism and is rotatable about a centrally disposed axis relative to the dial face plate. The hour hand operates in conjunction with the timing mechanism 30 for indicating the current hour of a day in a conventional manner.

Figure 7:
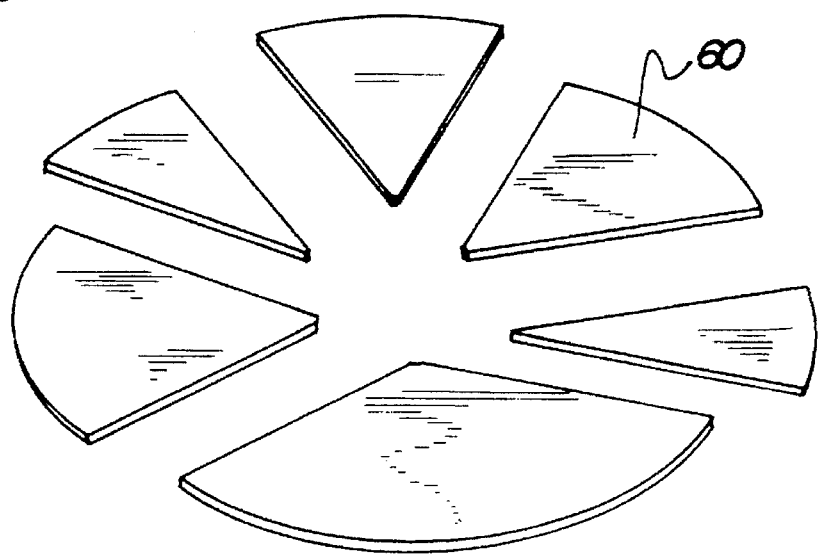
FIG. 7 is a perspective view of the generally pie-shaped pieces of different sizes and colors for use in providing an indication to a child when a particular activity is to be performed when secured to the dial face plate of the present invention.

A plurality of pie-shaped pieces 60 are also provided. The pie-shaped pieces are provided in a plurality of different sizes. Each piece is attachably fastened within the recessed area of the dial plate at a location between the hour hand and the recessed area. Several ways to couple the pieces to the dial face plate can be employed. For example, in FIG. 10, a snap-type fastener 61 is utilized. The fastener 61 is formed of a latching component 62 formed on a piece and a hooking component 63 integral with the dial face plate and extended outwards from the border 44 thereof. As shown in FIG. 11, a magnetic-type fastener can be utilized. The fastener is formed of a magnetic material 64 and a magnetically attractive material 65. The piece can be formed of the magnetic material and the dial face plate can be formed of the magnetically attractive material, or vice versa. Furthermore, as shown in FIG. 12, the fastening of the pieces to the dial face plate may be performed with a pile-type fastener 66. The pile-type fastener 66 is formed of a strip of hook material 67 coupled to a piece and a strip of loop material 68 coupled to the dial face plate, or vice versa. Each piece subtends a sectorial region on the dial face plate in relation to the hour hand 50 for representing a period of time when a certain activity is to be performed. Each piece further bears different pictorial designs or motifs or even colors that represent the activity to be performed when the hour hand is positioned over the piece. Some of the pieces can be utilized, or a plurality of pieces can be coupled to the dial face plate to create a disk as shown in FIG. 7.

Figure 8:
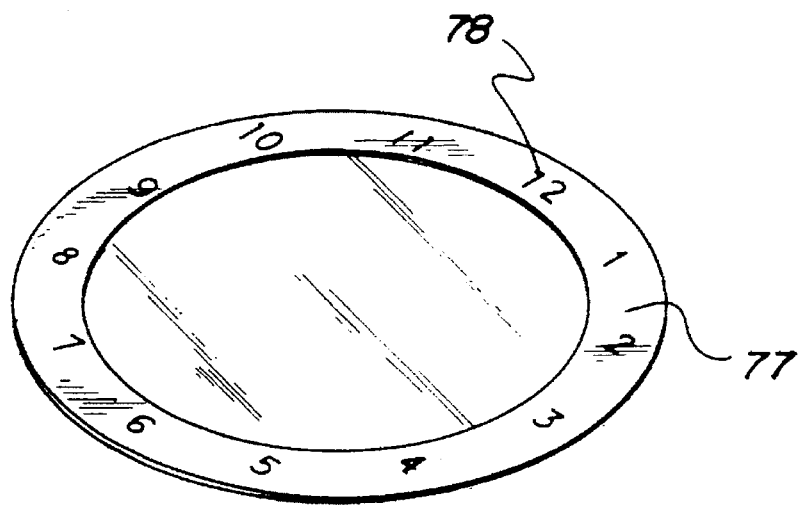
FIG. 8 depicts a face plate cover that can be attached to the present invention. This face plate cover has numbers positioned in a circular fashion for indicating a particular hour of time. This face plate cover is added to the present invention in lieu of the face plate cover shown in FIG. 6 once a child has learned to tell time.

A generally circular face plate cover 70 is provided. The face plate cover is removably hingably coupled to the housing with a pivot pin 71. As shown in FIG. 5, the face plate has a generally transparent and circular viewing port 72, a rigid annular border 74 secured about the viewing port, and a latch 76 extended outwards from the periphery of the border. The latch is removably positioned within the groove 22 of the housing for securing the face plate cover 70 over the opening of the housing, thus precluding access to the pieces. In an alternate embodiment, a different face plate cover 71 is secured to the housing in lieu of the face plate cover 70 as previously described. The face plate cover 71 bears numeric indicia 78 thereon in the form of arabic numbers as shown in FIG. 8 for indicating a numeric value for one of the hours based on a given position of the hour hand. Cover 71 is added in lieu of cover 70 when a child has learned to correctly determine the hour of the day.

In the preferred embodiment, a wrist band 80 is used for securing the housing to a wearer. The wrist band can be formed of a flexible fabric, leather, or metal material. The wrist band is formed of a first elongated flexible strap 82 coupled to one of the clasps 20 and a second elongated flexible strap 84 coupled to the other clasp. The end of the first strap 82 has a strip of pile-type fastener 85 coupled thereto. The end of the second strap has a complimentary strip of pile-type fastener 86 coupled thereto. The pile-type fasteners are securable in a closed loop configuration about a wrist of a wearer. Other similar fastening mechanisms such as buckles, snaps, and the like can also be utilized for securing the wrist band.

Figure 1:
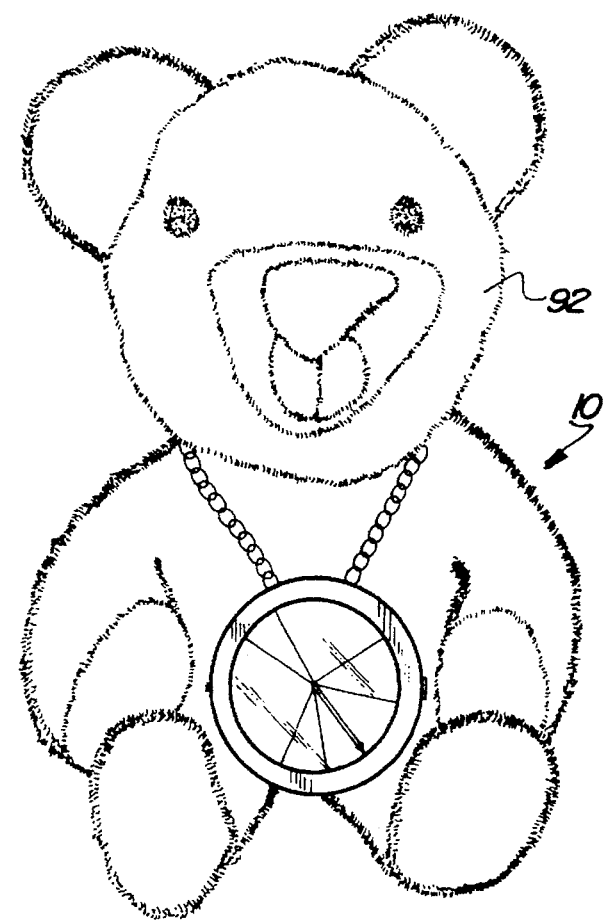
FIG. 1 is a side-elevational view of an embodiment of the present invention secured about a stuffed animal with a chain.
Figure 2:
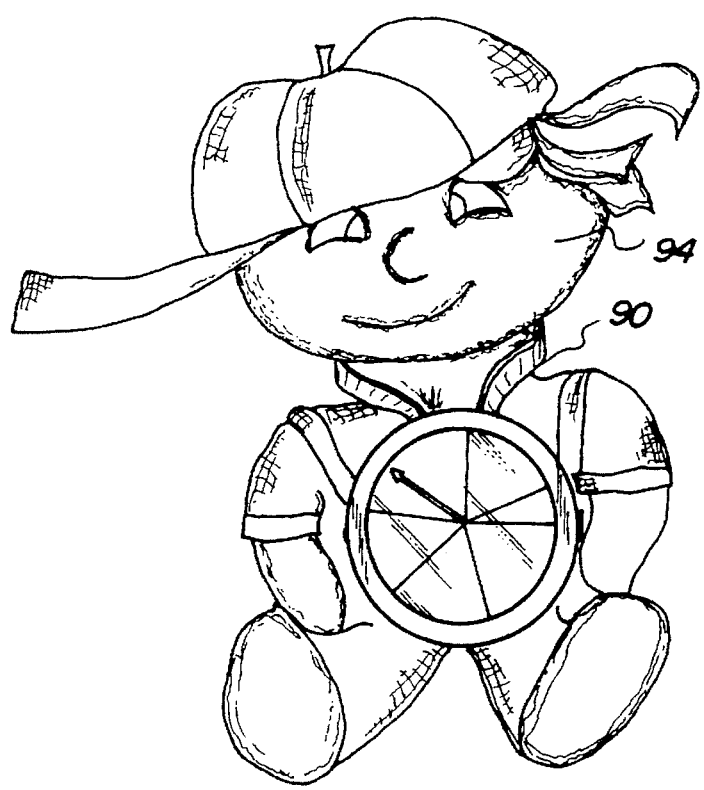
FIG. 2 is another side-elevational of another embodiment of the present invention secured around the neck of a boy doll with a strap.
Figure 4:
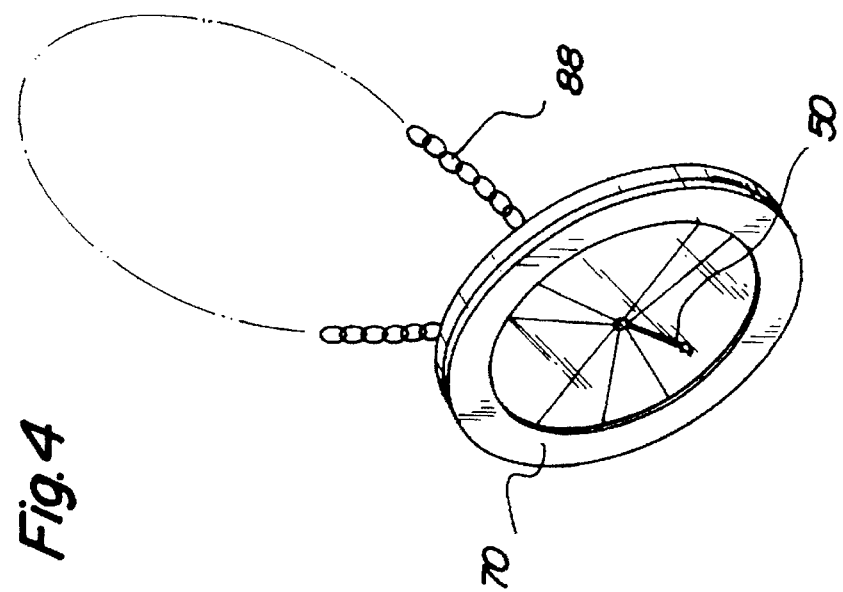
FIG. 4 is a perspective view of still yet another embodiment of the present invention.
Figure 3:
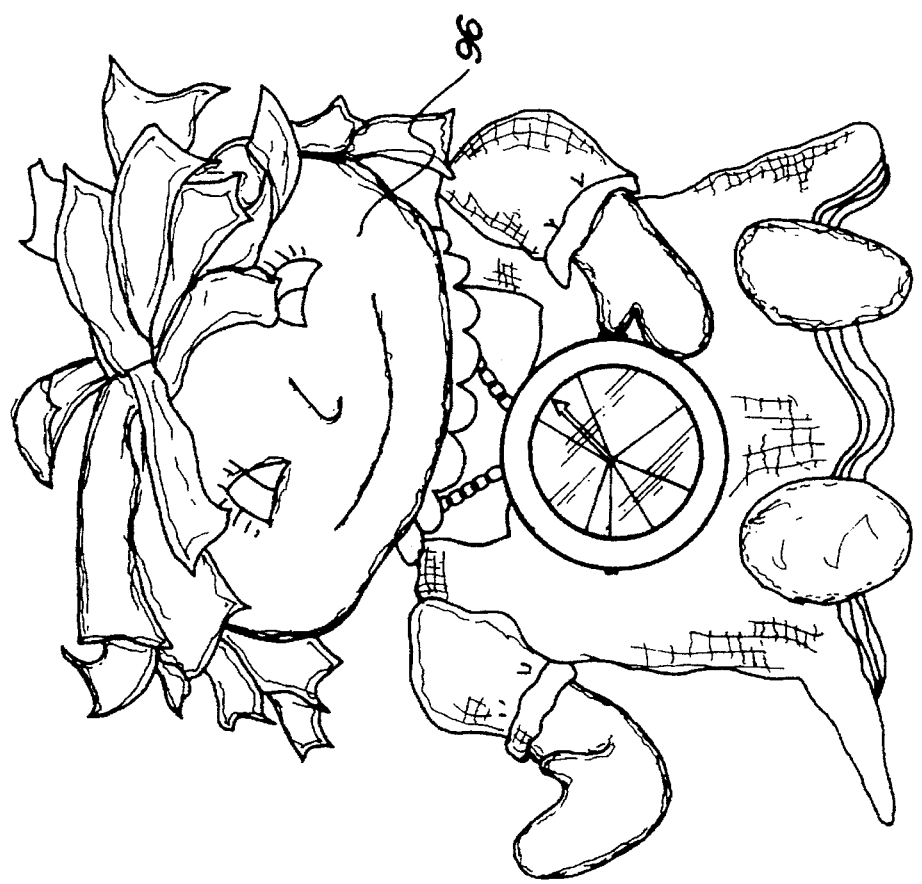
FIG. 3 is yet another side-elevational view yet another embodiment of the present invention secured about a neck of a girl doll with a chain.

In an alternate embodiment of the present invention, a chain 88 is used in lieu of the wrist band 80. A continuous strap 90 can also be used for securing the housing to a wearer as shown in FIG. 2. The chain or the strap is coupled to the housing in a loop-type configuration. In addition, a doll such as a bear 92, a boy 94, or a girl 96 can be provided with the present invention. The doll is used for holding the clock 10 in a stationary visible orientation for use by a child. Each doll bears pleasing surface ornamentation to capture a child's attention, thereby making the child more aware of the presence of the present invention.

Another embodiment of the present invention is presented. This embodiment includes substantially all of the components as previously described except that the timing mechanism 30 further keeps track of the current minute of the day. In addition, a minute hand 100 is included and removably coupled to the timing means for indicating the minute of the day in relation to the face plate 40 and pieces 60. As is conventional, the minute hand has a length greater than the hour hand 50.

The present invention is a teaching clock that provides an indication to a child when a particular activity is to be performed. Anyone who has children will know that the child is constantly asking what time to do different things, such as "Can I eat?", "Can I watch TV?", etc. These are the type of questions that children ask every day, all day long. The thing about these questions is that the answers are the same just about all of the time. The present invention is designed to minimize these questions and to subtly give children a sense of time and as an aid in developing a measure of independence.

The present invention consists of a round dial with generally triangular, colored-coated pieces or panels that encircle the dial face with pictures or appropriate images. Numerals identifying the hour are optional. The pieces display pictures of beds for indicating bedtime, silverware for indicating mealtime, bath accessories for indicating bathtime, etc., and are totally adjustable. The pictures can be changed to relate to the personal activities of a particular child or group of children. These pieces are placed strategically around the dial face of the clock in appropriate places, to show the child when it would be appropriate to do certain things. Various sized pieces or panels are offered to enable the parent to more closely tailor the activities and time. That is, when an activity is usually more time consuming than others, such as a nap, a larger piece would be used. The present invention serves as an aid in developing a child's practical reasoning skills.

The preferred embodiment of the present invention features only the hour hand to lessen confusion of the child while he is learning the system. The minute hand can be added later, but the hour hand is all that is required. The present invention can be offered individually or with a doll around whose neck the present invention would hang. The pieces can be made either of plastic film or cloth. They can be held on by snap-type fastening, magnetic type fastening, hook and loop fastening, or the like.

As to the manner of usage and operation of the present invention, the same should be apparent from the above description. Accordingly, no further discussion relating to the manner of usage and operation will be provided.

With respect to the above description then, it is to be realized that the optimum dimensional relationships for the parts of the invention, to include variations in size, materials, shape, form, function and the manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modification and changes will readily occur to those skilled in the art, it is not desired to limit the invention to the exact construction and operation shown and described, and accordingly, all suitable modification and equivalents may be resorted to, falling within the scope of the invention.

What is claimed as being new and desired to be protected by Letters Patent of the United States is as follows:

1. A teaching clock with removable repositionable pieces for representing different periods of time and for providing an indication to a child when a particular activity is to be performed comprising, in combination:

a rigid housing having a circular planar base plate with a rim extended peripherally upwards therefrom to define a hollow interior and a central circular opening for allowing access to the interior and with the wall further having a pair of diametrically positioned clasps each with a generally U-shaped configuration coupled thereto and extended outwards therefrom and an elongated groove formed thereon at a midpoint location between the clasps;

timing means disposed within the interior of the housing for keeping track of a current hour of a day, wherein the timing means includes conventional mechanical clockwork that is capable of being wound and set using a knob extended from the wall of the housing;

a dial face plate circular and generally flat in structure extended over the timing means and across the opening of the housing and with the dial face plate having a recessed area with a circumferential border positioned in axial alignment with the housing;

an hour hand coupled to the timing means and disposed over the dial face plate and with the hour hand rotatable about a centrally disposed axis relative to the dial face plate for indicating the current hour;

a plurality of different-sized and generally pie-shaped pieces attachably fastened within the recessed area of the dial plate below the hour hand, each piece subtending a sectoral region on the dial face plate in relation to the hour hand for representing a period of time when a certain activity is to be performed, each piece bearing different pictorial designs or motifs or colors representing the activity to be performed when the hour hand is positioned over the piece;

a generally circular face plate cover hingably coupled to the housing, the face plate cover having a generally transparent circular viewing port, an annular border secured about the viewing port, and a latch extended outwards from the border and with the latch removably positioned within the groove of the housing for securing the face plate cover over the opening of the housing and thereby precluding access to the pieces; and a wrist band formed of a first strap coupled to one of the clasps and a second strap coupled to the other clasp, the first strap having a strip of pile-type fastener coupled thereto and the second strap having a complimentary strip of pile-type fastener coupled thereto and with the pile-type fasteners securable in a closed loop configuration about a wrist of a wearer.

* * * * *